US011526220B2

(12) United States Patent
Lien et al.

(10) Patent No.: US 11,526,220 B2
(45) Date of Patent: Dec. 13, 2022

(54) METHOD AND APPARATUS OF USING A COMPUTER TOUCHPAD OR DIGITIZER STYLUS PAD AS A MOUSEPAD

(71) Applicant: Razer (Asia-Pacific) Pte. Ltd., Singapore (SG)

(72) Inventors: Jian Yao Lien, Singapore (SG); Rafael Raymund Viernes, Singapore (SG)

(73) Assignee: Razer (Asia-Pacific) Ptd. Ltd., Singapore (SG)

( * ) Notice: Subject to any disclaimer, the term of this patent is extended or adjusted under 35 U.S.C. 154(b) by 0 days.

(21) Appl. No.: 17/426,326

(22) PCT Filed: Feb. 4, 2019

(86) PCT No.: PCT/SG2019/050065
§ 371 (c)(1),
(2) Date: Jul. 28, 2021

(87) PCT Pub. No.: WO2020/162827
PCT Pub. Date: Aug. 13, 2020

(65) Prior Publication Data
US 2022/0164042 A1 May 26, 2022

(51) Int. Cl.
*G06F 3/0354* (2013.01)
*G06F 3/039* (2013.01)

(52) U.S. Cl.
CPC ........ *G06F 3/03547* (2013.01); *G06F 3/0395* (2013.01); *G06F 3/03543* (2013.01)

(58) Field of Classification Search
CPC . G06F 3/03547; G06F 3/03543; G06F 3/0395
(Continued)

(56) References Cited

U.S. PATENT DOCUMENTS

| 5,831,597 A | 11/1998 | West et al. |
| 8,766,925 B2 | 7/2014 | Perlin et al. |

(Continued)

FOREIGN PATENT DOCUMENTS

| KR | 2001-0044444 A | 6/2001 |
| KR | 10-1616668 B1 | 4/2016 |

(Continued)

OTHER PUBLICATIONS

International Search Report and Written Opinion, dated Dec. 27, 2019, for the corresponding International Application No. PCT/SG2019/050065 in 8 pages.

(Continued)

*Primary Examiner* — Mark Edwards
(74) *Attorney, Agent, or Firm* — Polsinelli PC

(57) ABSTRACT

A design that allows a touchpad or a digitizer stylus pad to double up as a mouse mat/pad so that a computer mouse can be used over it is provided. In an aspect of the disclosure, a method, a computer-readable medium, and an apparatus for managing input devices are provided. The apparatus may determine whether a surface input is received at an input surface. The apparatus may determine whether a mouse input is received at a computer mouse. The apparatus may disable one of the input surface and the computer mouse that has a lower priority than another of the input surface and the computer mouse when the surface input and the mouse input are received at respective input device within a threshold window of time.

20 Claims, 7 Drawing Sheets

(58) Field of Classification Search
USPC .......................................................... 345/173
See application file for complete search history.

(56) References Cited

U.S. PATENT DOCUMENTS

| | | | |
|---|---|---|---|
| 9,424,986 | B2 | 8/2016 | Wang |
| 10,108,337 | B2 | 10/2018 | Ligameri et al. |
| 2005/0008148 | A1 | 1/2005 | Jacobson |
| 2010/0156675 | A1* | 6/2010 | Ganey .................... G06F 3/038 341/20 |
| 2011/0267266 | A1 | 11/2011 | Xiang |
| 2011/0304545 | A1* | 12/2011 | Yao .................... G06F 3/04883 345/163 |
| 2013/0106704 | A1* | 5/2013 | Vidal .................... G06F 3/0219 345/169 |
| 2013/0227466 | A1 | 8/2013 | Mail et al. |
| 2015/0002399 | A1 | 1/2015 | Tang |
| 2015/0169218 | A1 | 6/2015 | Cromer et al. |
| 2016/0313817 | A1 | 10/2016 | Feng et al. |
| 2016/0342258 | A1 | 11/2016 | Han et al. |
| 2018/0275783 | A1 | 9/2018 | Thompson et al. |

FOREIGN PATENT DOCUMENTS

| | | |
|---|---|---|
| WO | WO 2008/082095 A1 | 7/2008 |
| WO | WO 2009/071188 A1 | 6/2009 |
| WO | WO 2010/013926 A2 | 2/2010 |
| WO | WO 2017/015938 A1 | 2/2017 |

OTHER PUBLICATIONS

Xiaojun Bi, Tovi Grossman, Justin Matejka, George Fitzmaurice, "Magic Desk: Bringing Multi-Touch Surfaces into Desktop Work", In Proceedings of the SIGCHI conference on Human factors in computing systems, pp. 2511-2520. ACM, 2011 (https://www.researchgate.net/profile/Justin_Matejka/publication/221518779_Magic_desk_Bringing_multi-touch_surfaces_into_desktop_work/links/550ad78a0cf290bdc1107ae3/Magic-desk-Bringing-multi-touch-surfaces-into-desktop-work.pdf).

Extended European Search Report dated Jan. 27, 2022, 8 pages, for the corresponding European Patent Application No. 19914428.8.

* cited by examiner

METHOD AND APPARATUS OF USING A COMPUTER TOUCHPAD OR DIGITIZER STYLUS PAD AS A MOUSEPAD

TECHNICAL FIELD

Various aspects of this disclosure generally relate to human-computer interaction, and more particularly, to a computer touchpad or digitizer stylus pad that can also be used as a mousepad.

BACKGROUND

Computing technology has seen a many-fold increase in capability ever since it was created. Processors work at ever higher rates; memories are ever larger and always faster; mass storage is larger and cheaper every year. Computers now are essential elements in many aspects of life, and are often used to present three-dimensional worlds to users, in everything from games to scientific visualization.

Human-computer interaction (HCI) researches the design and use of computer technology, focused on the interfaces between humans (users) and computers. Humans interact with computers in many ways. The interface between humans and computers is crucial to facilitating this interaction. The interface between the user and the computer has not seen the same rate of change as the computing technology. For example, screen windows, keyboard, monitor, and mouse are the standard, and have seen little change since their introduction. Little thought is given to the human-computer interface, although most of the user's experience with the computer is dominated by the interface between the user and the computer.

A touchpad or trackpad is a pointing device featuring a tactile sensor, a specialized surface that can translate the motion and position of a user's fingers to a relative position on the operating system that is made output to the screen. A stylus (or stylus pen) is a small pen-shaped instrument that is used to input commands to a computer screen, mobile device or graphics tablet. With touchscreen devices (may be referred as digitizer stylus pad), a user places a stylus on the surface of the screen to draw or make selections by tapping the stylus on the screen.

A computer mouse is a hand-held pointing device that detects two-dimensional motion relative to a surface. This motion is typically translated into the motion of a pointer on a display, which allows a smooth control of the graphical user interface. Most computer mice may need to be used with a mousepad for optimal performance.

For graphical designers who are also computer garners, a computer mouse and an input surface for touch and/or stylus may be essential human-computer interaction tools. However, the input surface for touch and/or stylus and a mousepad for the computer mouse may take up large areas of valuable space on the computer desk.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A design that allows a touchpad or a digitizer stylus pad to double up as a mouse mat/pad so that a computer mouse can be used over it is provided. In an aspect of the disclosure, a method, a computer-readable medium, and an apparatus for managing input devices are provided. The apparatus may determine whether a surface input is received at an input surface. The apparatus may determine whether a mouse input is received at a computer mouse. The apparatus may disable one of the input surface and the computer mouse that has a lower priority than another of the input surface and the computer mouse when the surface input and the mouse input are received at respective input device within a threshold window of time.

In another aspect of the disclosure, an input surface is provided. The input surface may include a wireless communication circuit configured to communicate wirelessly with a computer mouse to receive information regarding whether a mouse input is received at the computer mouse. The input surface may include a control circuit. The control circuit may be configured to determine whether a surface input is received at the input surface. The control circuit may be further configured to disable the input surface when the input surface has lower priority than the computer mouse and when the surface input and the mouse input are received at respective input device within a threshold window of time.

In yet another aspect of the disclosure, a computer mouse is provided. The computer mouse may include a wireless communication circuit configured to communicate wirelessly with an input surface to receive information regarding whether a surface input is received at the input surface. The computer mouse may include a control circuit. The control circuit may be configured to determine whether a mouse input is received at the computer mouse. The control circuit may be further configured to disable the computer mouse when the computer mouse has lower priority than the input surface and when the surface input and the mouse input are received at respective input device within a threshold window of time.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
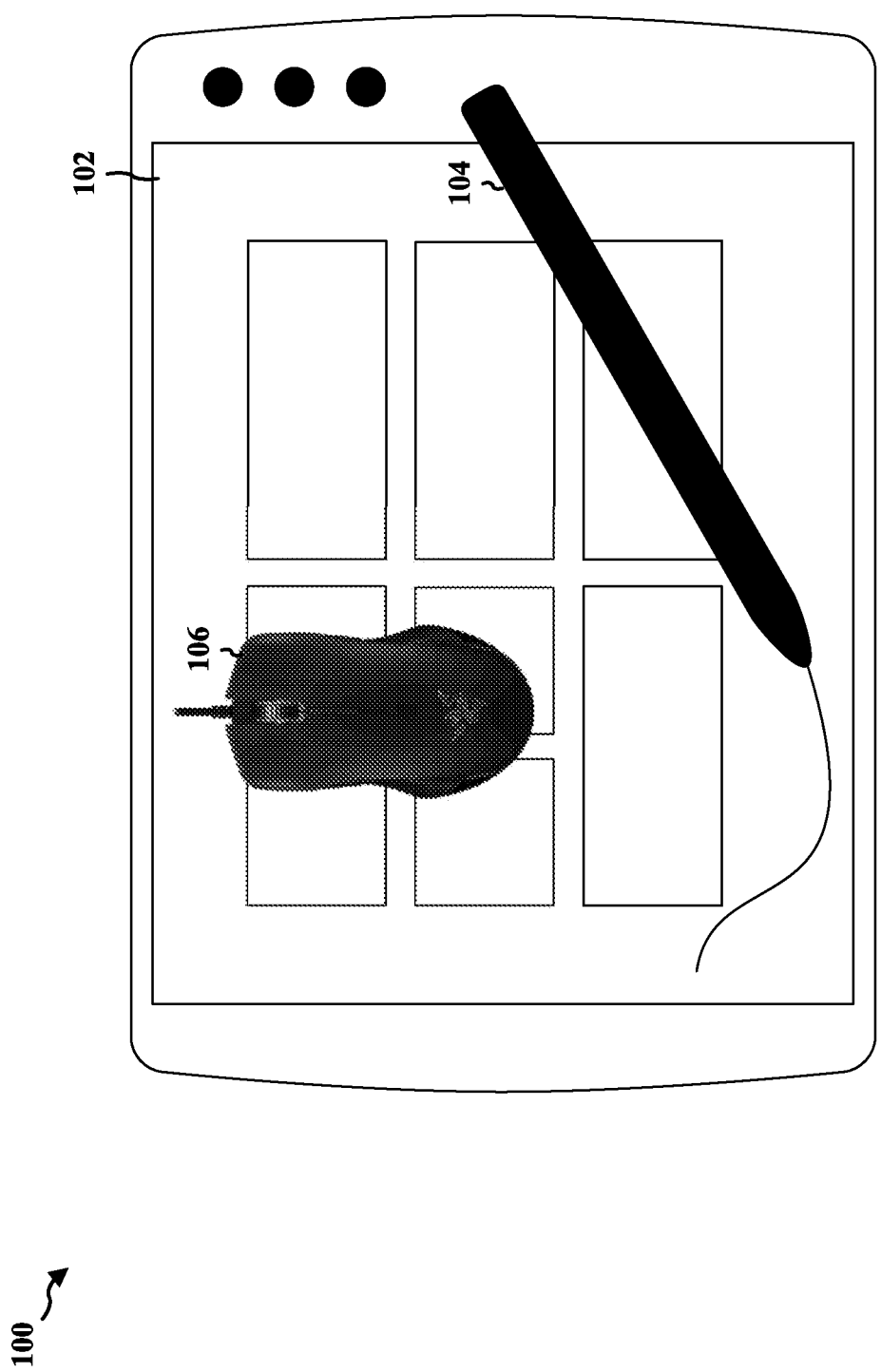
FIG. 1 is a diagram illustrating an example of allowing an input surface to double up as a mousepad so that a computer mouse can be used over it.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a computer touchpad or digitizer stylus pad that is also a mousepad will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating an example of allowing an input surface 102 to double up as a mousepad so that a computer mouse 106 can be used over it. The input surface 102 may be a touchpad, a digitizer stylus pad, or a graphic tab. In some embodiments, a stylus pen 104 may be used on the input surface 102 to provide user inputs. In some embodiments, the input surface 102 may translate the motion and position of a user's fingers into user inputs.

In some embodiments, a user may only need a single device for touch/stylus and mouse with mouse mat/pad function rather than to have multiple devices that take up large areas of valuable space on the computer desk. This is especially useful for graphical designers who are also computer garners.

In some embodiments, the touch/stylus function of the input surface 102 may be disabled automatically when the computer mouse 106 is being used over the input surface 102 if the computer mouse 106 has higher priority than the input surface 102. In some embodiments, the mouse function of the computer mouse 106 may be disabled automatically when the input surface 102 is in use if the input surface 102 has higher priority than the computer mouse 106. In some embodiments, the automatic disabling of the touch/stylus function or the mouse function may be performed via a computer interface software (e.g., Razer Synapse).

In some embodiments, an interface software (e.g., Synapse) may allow the user to identify or select the desired operating input device to be disabled when the other input device is in use. The interface software may have its own database of supported devices and may be able to identify each device by reading the assigned USB PID (product identifier) and/or VID (vendor identifier) information from each device. Each USB device (e.g., the input surface 102 or the computer mouse 106) may be required to have PID/VID information embedded in its firmware for USB enumeration and device identification.

In some embodiments, a priority level may be set to each input device in case both devices are activated at the same time or within a small window of time. As a result, the input device with higher priority may remain operable while the other input device may be disabled. The window duration may be a preset value or may be programmable by the user via the interface software.

For example, if the computer mouse 106 has higher priority than the input surface 102, when the computer mouse 106 is used over the input surface 102, the computer interface software may recognize the computer mouse 106 being used as an input device and automatically disables the input function of the input surface 102, so that the input devices do not interference with each other.

In some embodiments, by default, the mouse function has the higher priority and the touchpad/digital stylus function may then be disabled by sending suspend command to the input surface 102. Likewise, the device priority may also be set (e.g., via the interface software) so that the input surface 102 has higher priority than the computer mouse 106.

In some embodiments, a short time out period may be implemented after the last usage of the high priority input device before re-enabling the low priority input device. In some embodiments, the computer interface software may or may not include an option for the user to enable or disable the "auto disabling" of the unused input device.

In some embodiments, the computer mouse 106 and the input surface 102 may still work together in the absence of the computer interface software by means of hardware/firmware functions. The computer mouse 106 and the input surface 102 may have built in radio frequency (RF) and/or near-field communication (NFC) circuits. The RF circuits may allow the computer mouse 106 and the input surface 102 to communicate wirelessly (e.g., to inform each paired device if the other device has been activated). The NFC circuits may be used to initiate wireless pairing. Lighting on the computer mouse 106 and the input surface 102 may provide visual feedback for the pairing process or selected "active" device indication.

In some embodiments, the hardware/firmware based (no interface software) computer mouse 106 and input surface 102 may function in the same way as the computer software interface solution described above.

In some embodiments, there may be a dedicated "activate" switch on both the computer mouse 106 and the input surface 102. Depressing the "activate" button on each device may disable the other paired device's input. In this case, there is no auto disabling/enabling of the non-activated device. User needs manually depress the "activate" switch on the non-active device in order to use it. In some embodiments, lighting indicator may provide visual feedback to the user to indicate which device's input is currently active.

In some embodiments, the input surface 102 may or may not have a replaceable top mouse pad cover when doubling as a mousepad. In some embodiments, the input surface 102 may or may not have lighting. The lighting may be single or multi-color (e.g., RGB) lighting. In some embodiments, the lighting may include light-emitting diode (LED), LED drivers, or any other LED driving electronics. In some embodiments, the input surface 102 may include all forms of touch input devices (resistive, capacitive, ultrasonic, infrared radiation based, piezo, etc.).

Figure 2:
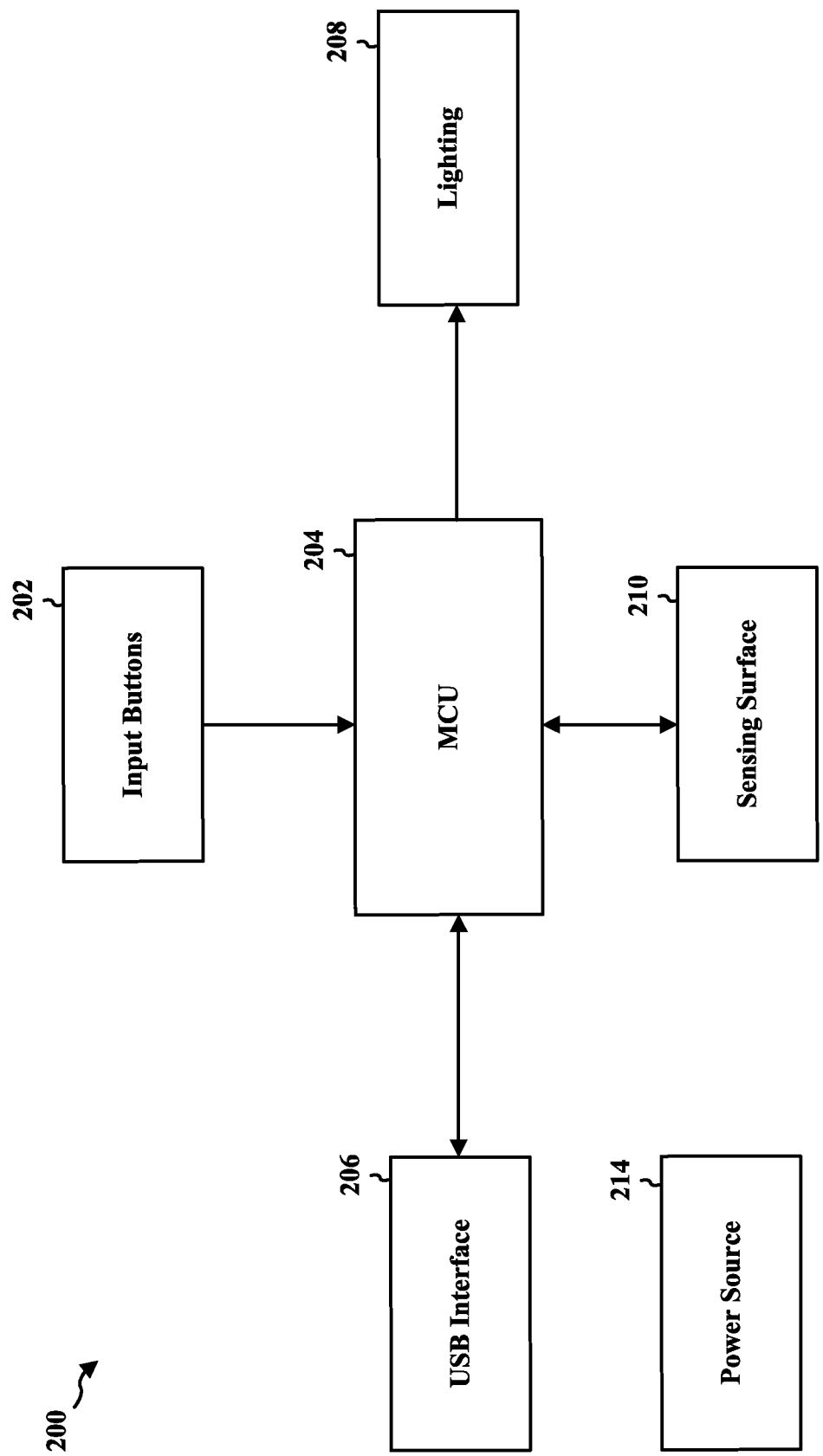
FIG. 2 illustrates a generic functional block diagram of a touchpad or digitizer stylus pad.

FIG. 2 illustrates a generic functional block diagram of a touchpad or digitizer stylus pad 200. In some embodiments, the touchpad or digitizer stylus pad 200 may be the input surface 102 described above with reference to FIG. 1. As illustrated, the touchpad or digitizer stylus pad 200 may include input buttons 202, a microcontroller unit (MCU) 204, a USB interface 206, lighting 208, a sensing surface 210, and a power source 214.

The sensing surface 210 may sense user inputs and provide the user inputs to the MCU 204. The MCU 204 may enable or disable the sensing surface 210. The MCU 204 may control the lighting 208 based on the active status of the sensing surface 210.

Figure 3:
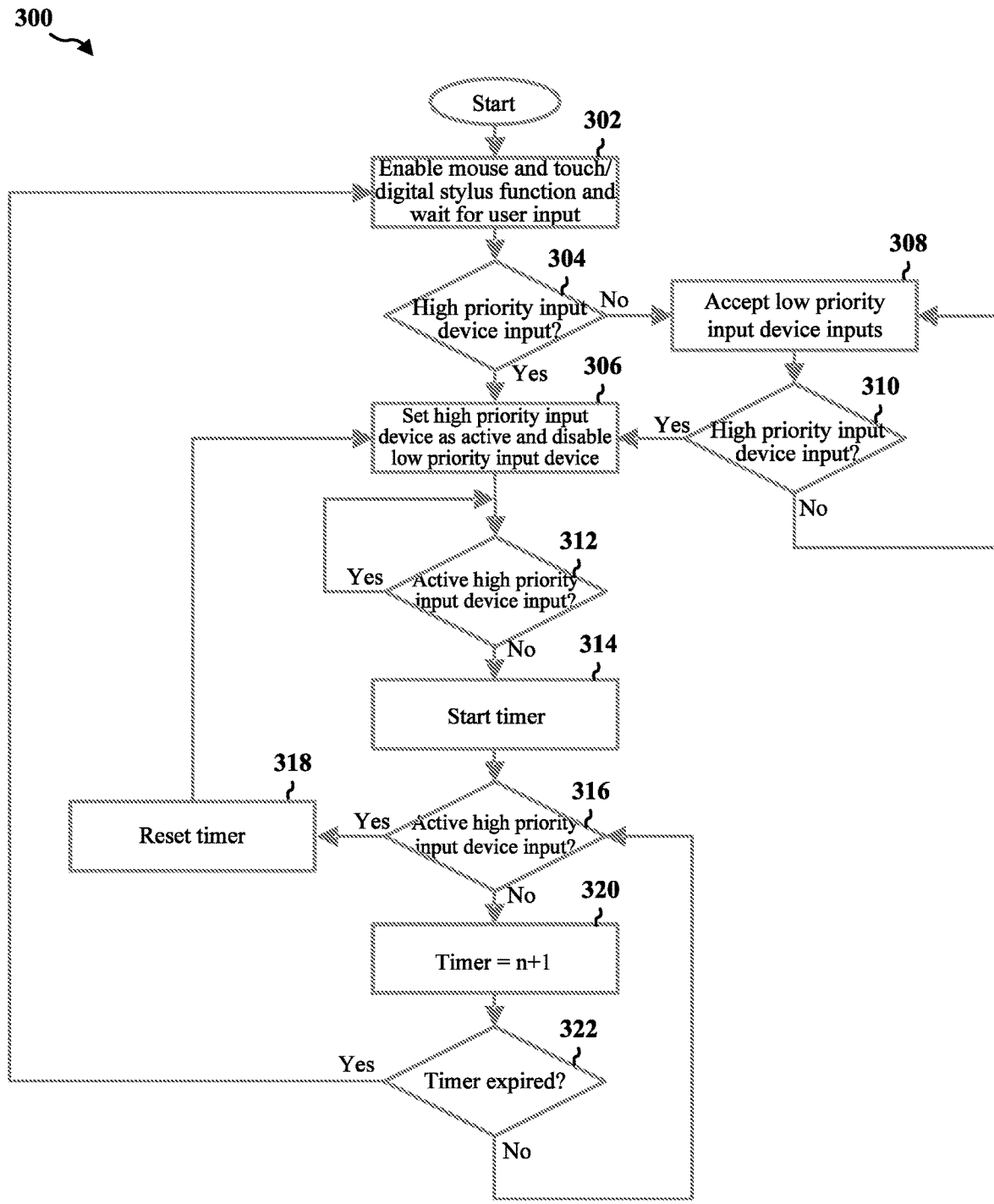
FIG. 3 is a flowchart of a method of managing input devices.

FIG. 3 is a flowchart 300 of a method of managing input devices. In one embodiment, the method may be performed by an apparatus (e.g., the apparatus 402/402' described below with reference to FIG. 4 or FIG. 5). The apparatus may be coupled to two input devices: a computer mouse (e.g., the computer mouse 106 described above in FIG. 1) and an input surface (e.g., the input surface 102 described above in FIG. 1, the touchpad or digitizer stylus pad 200 described above in FIG. 2). In some embodiments, one of the two input devices may have a higher priority than the other. In some embodiments, by default, the computer mouse may be the high priority input device and the input surface may be the low priority input device.

At 302, the apparatus may enable the mouse and touch/digital stylus function and wait for user input.

At 304, the apparatus may determine whether a received user input is from the high priority input device. If the user input is from the high priority input device, the apparatus may proceed to 306. If the user input is not from the high priority input device, the apparatus may proceed to 308.

At 308, the apparatus may accept user inputs from the low priority input device if no high priority input is detected. By way of example, the apparatus continuously monitors the received input signals and shifts to the high priority input device if input signals from the high priority input device are detected as detailed at 310.

At 310, the apparatus may determine whether user input is received at the high priority input device. If user input is received at the high priority input device, the apparatus may proceed to 306. If user input is not received at the high priority input device, the apparatus may loop back to 308 to accept the low priority input.

At 306, the apparatus may set high priority input device as active and disable the low priority input device.

At 312, the apparatus may determine whether the high priority input device is active. If the high priority input device is active, the apparatus may loop back to 312 to take input signals from the high priority input device. If the high priority input device is not active, the apparatus may proceed to 314.

At 314, the apparatus may start a timer to record the duration of time when there is no user input at the high priority input device.

At 316, the apparatus may determine whether user input is currently received at the high priority input device. If user input is currently received at the high priority input device, the apparatus may proceed to 318. If user input is not currently received at the high priority input device, the apparatus may proceed to 320.

At 318, the apparatus may reset the timer and loop back to 306.

At 320, the apparatus may increment the timer, e.g., by one unit of time.

At 322, the apparatus may determine whether the timer has expired. If the timer has expired, i.e., the high priority input device is not active for a period of time, the apparatus may loop back to 302 to re-determine whether to take input signals from the high priority input device or from the low priority input device. If the timer is not yet expired, the apparatus may loop back to 316.

Figure 4:
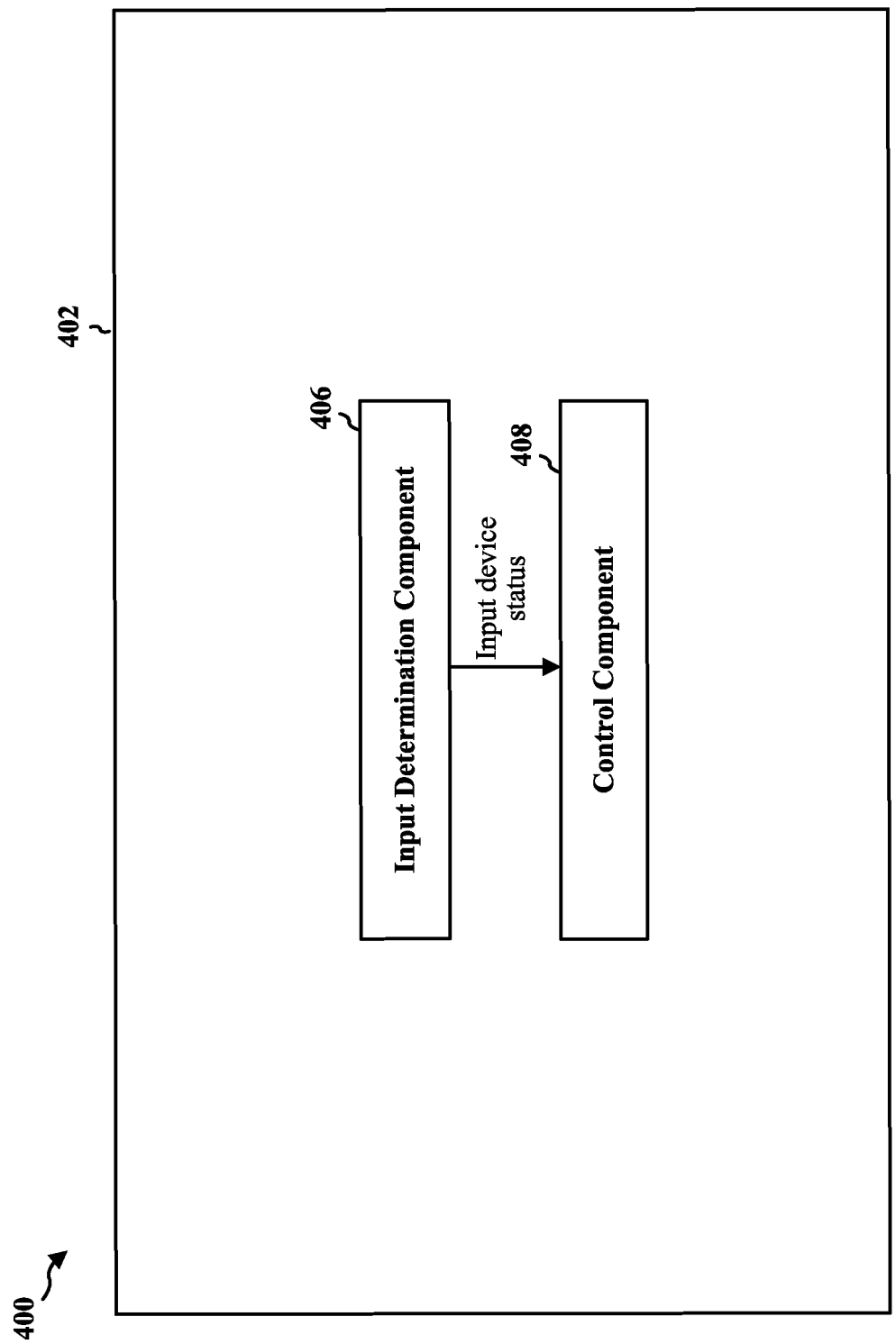
FIG. 4 is a conceptual data flow diagram illustrating the data flow between different means/components in an exemplary apparatus.

FIG. 4 is a conceptual data flow diagram 400 illustrating the data flow between different means/components in an exemplary apparatus 402. In one embodiment, the apparatus 402 may include one or more computing devices.

The apparatus 402 may include an input determination component 406 that determines the status of the input devices associated with the apparatus 402 (e.g., the computer mouse 106 and the input surface 102 described above in FIG. 1). In one embodiment, the input determination component 406 may perform the operations described above with reference to 304, 310, 312, or 316 in FIG. 3.

The apparatus 402 may include a control component 408 that enables or disables the associated input devices based on the status of the input devices provided by the input determination component 406. In one embodiment, the control component 408 may perform the operations described above with reference to 302, 308, 306, 314, 318, 320, or 322 in FIG. 3.

The apparatus 402 may include additional components that perform each of the blocks of the algorithm in the aforementioned flowchart of FIG. 3. As such, each block in the aforementioned flowchart of FIG. 3 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 5:
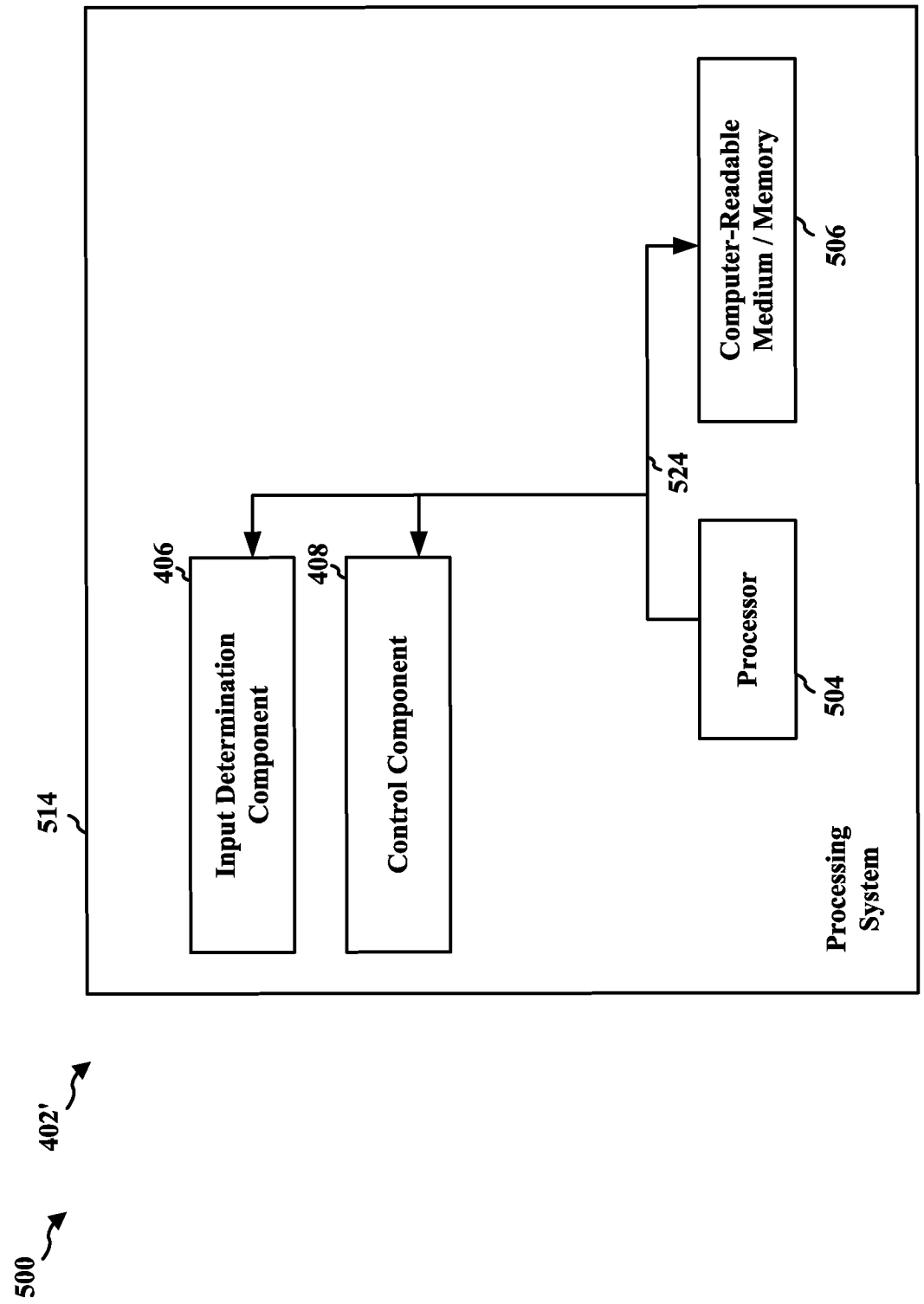
FIG. 5 is a diagram illustrating an example of a hardware implementation for an apparatus employing a processing system.

FIG. 5 is a diagram 500 illustrating an example of a hardware implementation for an apparatus 402' employing a processing system 514. In one embodiment, the apparatus 402' may be the apparatus 402 described above with reference to FIG. 4. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the components 406, 408, and the computer-readable medium/memory 506. The bus 524 may also link various other circuits such as timing sources, peripherals, voltage regulators, and power management circuits, which are well known in the art, and therefore, will not be described any further.

The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the components 406, 408. The components may be software components running in the processor 504, resident/stored in the computer readable medium/memory 506, one or more hardware components coupled to the processor 504, or some combination thereof.

Figure 6:
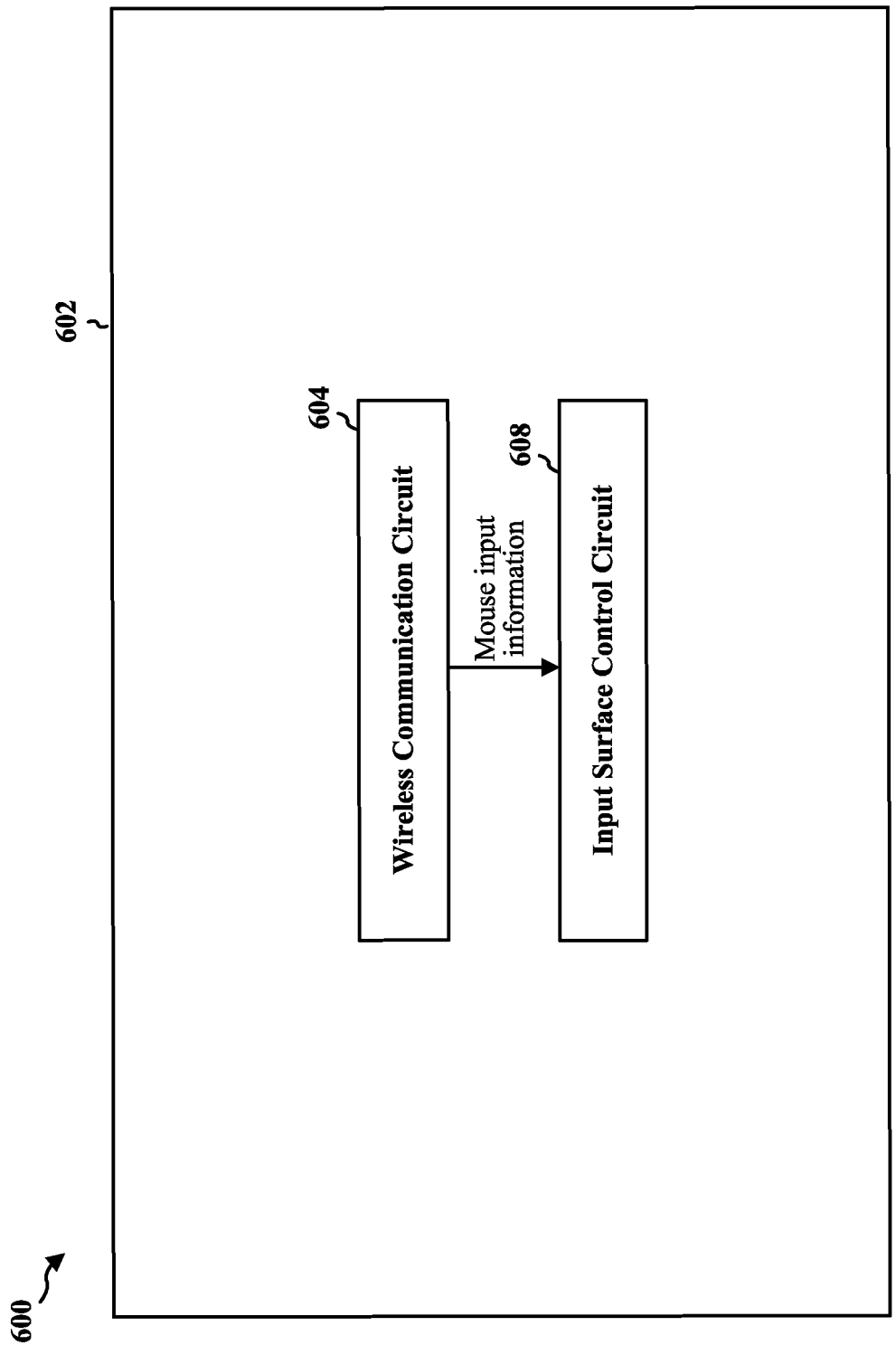
FIG. 6 is diagram illustrating an example of a hardware or firmware implement of an input surface.

FIG. 6 is diagram 600 illustrating an example of a hardware or firmware implement of an input surface 602. In some embodiments, the input surface 602 may be the input surface 102 described above with reference to FIG. 1 or the touchpad or digitizer stylus pad 200 described above with reference to FIG. 2.

The input surface 602 may include a wireless communication circuit 604 that is configured to communicate wirelessly with a computer mouse (e.g., the computer mouse 106 described above in FIG. 1 or the computer mouse 702 described below in FIG. 7) to receive information regarding whether a mouse input is received at the computer mouse. In some embodiments, the wireless communication circuit 604 may include RF and/or NFC circuits.

The input surface 602 may include a control circuit 608. The control circuit 608 may be configured to determine whether a surface input is received at the input surface 602. The control circuit 608 may be configured to disable the input surface when the input surface has lower priority than the computer mouse and when the surface input and the mouse input are received at respective input device within a threshold window of time.

The input surface 602 may include additional components that perform additional operations. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
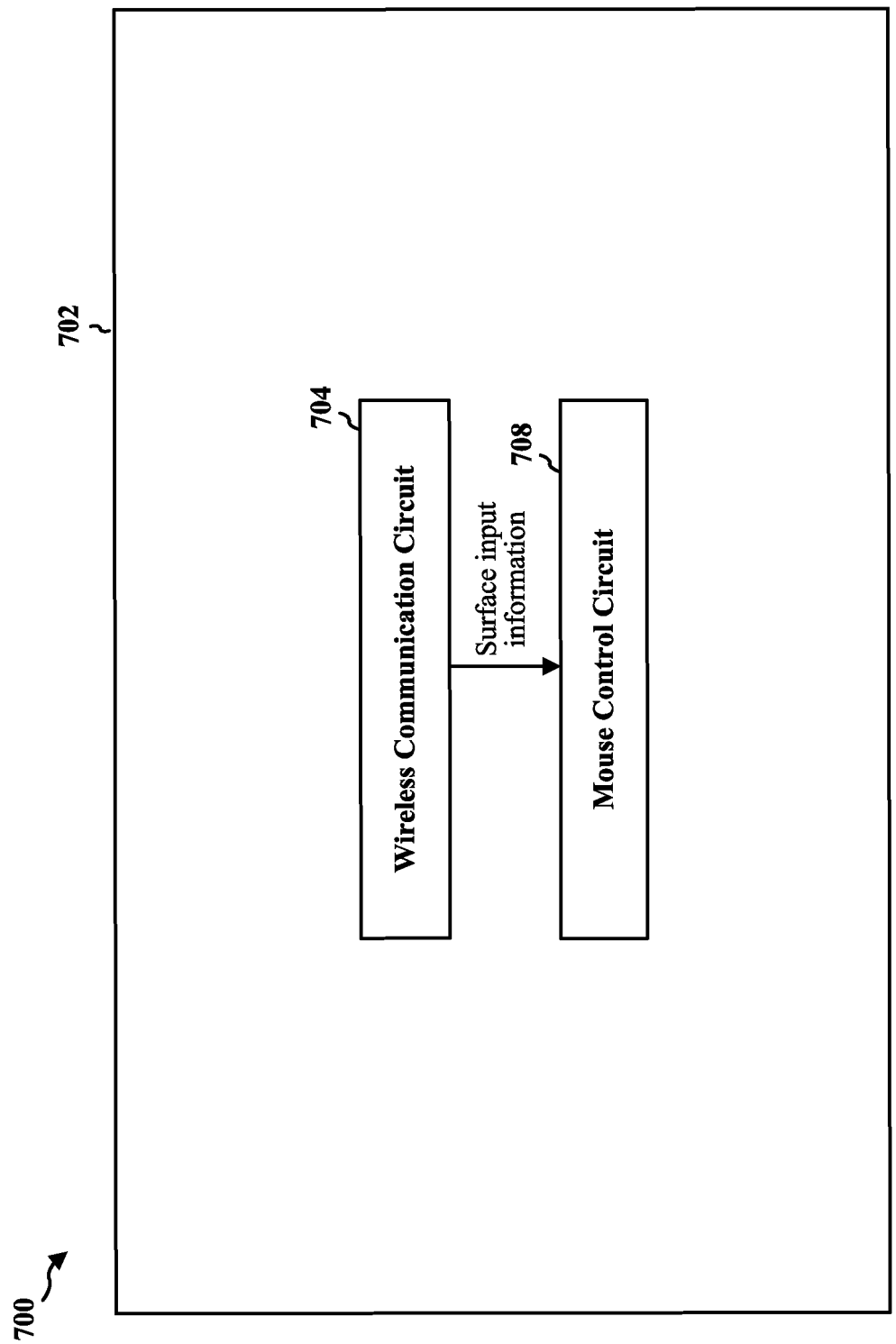
FIG. 7 is diagram illustrating an example of a hardware or firmware implement of a computer mouse.

FIG. 7 is diagram 700 illustrating an example of a hardware or firmware implement of a computer mouse 702. In some embodiments, the computer mouse 702 may be the computer mouse 106 described above with reference to FIG. 1.

The computer mouse 702 may include a wireless communication circuit 704 that is configured to communicate wirelessly with an input surface (e.g., the input surface 102 described above in FIG. 1, the touchpad or digitizer stylus pad 200 described above in FIG. 2, or the input surface 602 described above in FIG. 6) to receive information regarding whether a surface input is received at the input surface. In some embodiments, the wireless communication circuit 704 may include RF and/or NFC circuits.

The computer mouse 702 may include a control circuit 708. The control circuit 708 may be configured to determine whether a mouse input is received at the computer mouse 702. The control circuit 708 may be configured to disable the computer mouse when the computer mouse has lower priority than the input surface and when the surface input and the mouse input are received at respective input device within a threshold window of time.

The computer mouse 702 may include additional components that perform additional operations. The components may be one or more hardware components specifically configured to carry out the stated processes/algorithm, implemented by a processor configured to perform the stated processes/algorithm, stored within a computer-readable medium for implementation by a processor, or some combination thereof.

In the following, various aspects of this disclosure will be illustrated:

Example 1 is a method or apparatus for managing input devices. The apparatus may determine whether a surface input is received at an input surface. The apparatus may determine whether a mouse input is received at a computer mouse. The apparatus may disable one of the input surface and the computer mouse that has a lower priority than another of the input surface and the computer mouse when the surface input and the mouse input are received at respective input device within a threshold window of time.

In some embodiments, the apparatus may determine that a surface input (if it is set to lower priority) be disabled and reject the surface input even if the surface input is sent to the apparatus before the mouse input (higher priority device) within a threshold window of time. This is to prevent unintended user input to the surface input as it is likely that the surface input may receive an unintended input from the user when the user places a mouse on the input surface or when the user starts using the mouse on the input surface from a rest state. An example of a threshold window of time is 10 ms to 100 ms. Higher threshold window of time will result in higher input latencies from the lower input surface (when it is set to lower priority). In some embodiments, the threshold window of time may not be constant. The threshold window of time may be reduced or disabled (to reduce input latency) if the input surface is constantly in use. The threshold window of time may be reset to its original value when both devices remain inactive for a short period of time.

In some embodiments, the surface input represents any input that is received at the input surface; and the mouse input represents any input that is received at the computer mouse.

In Example 2, the subject matter of Example 1 may optionally include that the apparatus may further disable the input surface when the mouse input is received at the computer mouse and the surface input is not received at the input surface.

In Example 3, the subject matter of any one of Examples 1 to 2 may optionally include that the apparatus may further disable the computer mouse when the surface input is received at the input surface and the mouse input is not received at the computer mouse.

In Example 4, the subject matter of any one of Examples 1 to 3 may optionally include that the input surface may include one of a touchpad, a digitizer stylus pad, and a graphic tab.

In Example 5, the subject matter of any one of Examples 1 to 4 may optionally include that each of the input surface and the computer mouse may have product identifier information or vendor identifier information embedded in firmware for device identification.

In Example 6, the subject matter of any one of Examples 1 to 5 may optionally include that the apparatus may further re-enable the disabled one of the input surface and the computer mouse when a time out period expires after the last usage of the other of the input surface and the computer mouse.

In Example 7, the subject matter of any one of Examples 1 to 6 may optionally include that the apparatus may further receive a user input to adjusting priority between the input surface and the computer mouse.

Example 8 is an input surface. The input surface may include a wireless communication circuit configured to communicate wirelessly with a computer mouse to receive information regarding whether a mouse input is received at the computer mouse. The input surface may include a control circuit. The control circuit may be configured to determine whether a surface input is received at the input surface. The control circuit may be configured to disable the input surface when the input surface has lower priority than the computer mouse and when the surface input and the mouse input are received at respective input device within a threshold window of time.

In some embodiments, the control circuit may disable the surface input (set to lower priority) and the surface input may be rejected even if this input is received before the mouse input (set to higher priority) within a threshold window of time. For example, the threshold window of time may be 0.1 second. Therefore, if the surface input and the mouse input are received at their respective input device within 0.1 second, the control circuit may disable the input surface if the input surface has lower priority than the computer mouse. In some embodiments, the surface input represents any input that is received at the input surface; and the mouse input represents any input that is received at the computer mouse.

In Example 9, the subject matter of Example 8 may optionally include that the control circuit may be further configured to disable the input surface when the mouse input is received at the computer mouse and the surface input is not received at the input surface.

In Example 10, the subject matter of any one of Examples 8 to 9 may optionally include that each of the input surface and the computer mouse may have product identifier information or vendor identifier information embedded in firmware for device identification.

In Example 11, the subject matter of any one of Examples 8 to 10 may optionally include that the control circuit may be further configured to re-enable the disabled input surface when a time out period expires after the last mouse input is received at the computer mouse.

In Example 12, the subject matter of any one of Examples 8 to 11 may optionally include that the input surface may further include a switch, where the wireless communication circuit may be further configured to transmit a command to the computer mouse to disable the computer mouse when the switch is pressed.

Example 13 is a computer mouse. The computer mouse may include a wireless communication circuit configured to communicate wirelessly with an input surface to receive information regarding whether a surface input is received at the input surface. The computer mouse may include a control circuit. The control circuit may be configured to determine whether a mouse input is received at the computer mouse. The control circuit may be configured to disable the computer mouse when the computer mouse has lower priority than the input surface and when the surface input and the mouse input are received at respective input device within a threshold window of time.

In some embodiments, the control circuit may determine whether the surface input and the mouse input are received at respective input device within a threshold window of time. For example, the threshold window of time may be 0.1 second. Therefore, if the surface input and the mouse input are received at their respective input device within 0.1 second, the control circuit may disable the computer mouse and the mouse input may be rejected if the computer mouse has lower priority than the input surface. In some embodiments, the surface input represents any input that is received at the input surface; and the mouse input represents any input that is received at the computer mouse.

In Example 14, the subject matter of Example 13 may optionally include that the control circuit may be further configured to disable the computer mouse when the surface input is received at the input surface and the mouse input is not received at the computer mouse.

In Example 15, the subject matter of any one of Examples 13 to 14 may optionally include that each of the input surface and the computer mouse may have product identifier information or vendor identifier information embedded in firmware for device identification.

In Example 16, the subject matter of any one of Examples 13 to 15 may optionally include that the control circuit may be further configured to re-enable the disabled computer mouse when a time out period expires after the last surface input is received at the input surface.

In Example 17, the subject matter of any one of Examples 13 to 16 may optionally include that the computer mouse may further include a switch, where the wireless communication circuit may be further configured to transmit a command to the input surface to disable the input surface when the switch is pressed.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing input devices, the method comprising:
   providing an input surface configured to double up as a mouse pad so that a computer mouse can be used over it;
   determining whether a surface input is received at the input surface;
   determining whether a mouse input is received at the computer mouse; and
   disabling one of the input surface and the computer mouse that has a lower priority than another of the input surface and the computer mouse when the surface input and the mouse input are received at respective input device within a threshold window of time.

2. The method of claim 1, further comprising disabling the input surface when the mouse input is received at the computer mouse and the surface input is not received at the input surface.

3. The method of claim 1, further comprising disabling the computer mouse when the surface input is received at the input surface and the mouse input is not received at the computer mouse.

4. The method of claim 1, wherein the input surface comprises one of a touchpad, a digitizer stylus pad, and a graphic tab.

5. The method of claim 1, wherein each of the input surface and the computer mouse has product identifier information or vendor identifier information embedded in firmware for device identification.

6. The method of claim 1, further comprising re-enabling the disabled one of the input surface and the computer mouse when a time out period expires after a last usage of the other of the input surface and the computer mouse.

7. The method of claim 1, further comprising receiving a user input to adjusting priority between the input surface and the computer mouse.

8. An apparatus for managing input devices, the apparatus comprising:
   a memory; and
   at least one processor coupled to the memory and configured to:
      determine whether a surface input is received at an input surface, wherein the input surface is configured to double up as a mouse pad so that a computer mouse can be used over it;
      determine whether a mouse input is received at the computer mouse; and
      disable one of the input surface and the computer mouse that has a lower priority than another of the input surface and the computer mouse when the surface input and the mouse input are received at respective input device within a threshold window of time.

9. The apparatus of claim 8, wherein the at least one processor is further configured to disable the input surface when the mouse input is received at the computer mouse and the surface input is not received at the input surface.

10. The apparatus of claim 8, wherein the at least one processor is further configured to disable the computer mouse when the surface input is received at the input surface and the mouse input is not received at the computer mouse.

11. The apparatus of claim 8, wherein the input surface comprises one of a touchpad, a digitizer stylus pad, and a graphic tab.

12. The apparatus of claim 8, wherein each of the input surface and the computer mouse has product identifier information or vendor identifier information embedded in firmware for device identification.

13. The apparatus of claim 8, wherein the at least one processor is further configured to re-enable the disabled one of the input surface and the computer mouse when a time out period expires after a last usage of the other of the input surface and the computer mouse.

14. The apparatus of claim 8, wherein the at least one processor is further configured to receive a user input to adjusting priority between the input surface and the computer mouse.

15. An input device system comprising:
   an input surface and a computer mouse, wherein the input surface is configured to double up as a mouse pad so that the computer mouse can be used over it;
   a wireless communication circuit configured to communicate wirelessly with the computer mouse to receive information regarding whether a mouse input is received at the computer mouse; and
   a control circuit configured to:
      determine whether a surface input is received at the input surface; and
      disable the input surface when the input surface has lower priority than the computer mouse and when the surface input and the mouse input are received at respective input device within a threshold window of time.

16. The input device system of claim 15, wherein the control circuit is further configured to disable the input surface when the mouse input is received at the computer mouse and the surface input is not received at the input surface.

17. The input device system of claim 15, wherein each of the input surface and the computer mouse has product identifier information or vendor identifier information embedded in firmware for device identification.

18. The input device system of claim 15, wherein the control circuit is further configured to re-enable the disabled input surface when a time out period expires after a last mouse input is received at the computer mouse.

19. The input device system of claim 15, further comprising a switch, wherein the wireless communication circuit is further configured to transmit a command to the computer mouse to disable the computer mouse when the switch is pressed.

20. The input device system of claim 15, wherein the input surface comprises the wireless communication circuit and the control circuit or the computer mouse comprises the wireless communication circuit and the control circuit.

\* \* \* \* \*